US 6,736,871 B1

(12) United States Patent
Green et al.

(10) Patent No.: US 6,736,871 B1
(45) Date of Patent: May 18, 2004

(54) INTEGRATED FILTER SCREEN AND HYDROCARBON ADSORBER

(75) Inventors: Gregory Scott Green, Dearborn, MI (US); Jeffry Marvin Leffel, West Bloomfield, MI (US); Christopher Kenneth Roosen, Northville, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/315,614

(22) Filed: Dec. 9, 2002

(51) Int. Cl.⁷ .................... B01D 29/05; B01D 46/12; B01D 53/04
(52) U.S. Cl. .................... 55/385.3; 55/486; 55/524; 55/DIG. 5; 96/135; 96/153; 96/154
(58) Field of Search .................... 95/143, 146; 96/108, 96/134, 135, 138, 147, 153, 154; 55/385.3, 486, 518, 519, DIG. 5, DIG. 30

(56) References Cited

U.S. PATENT DOCUMENTS

| | | | | |
|---|---|---|---|---|
| 3,380,810 A | * | 4/1968 | Hamblin | 422/176 |
| 3,456,635 A | * | 7/1969 | Hervert | 123/519 |
| 3,541,765 A | * | 11/1970 | Adler et al. | 96/138 |
| 3,554,175 A | * | 1/1971 | Sarto | 123/519 |
| 3,572,013 A | * | 3/1971 | Hansen | 96/138 |
| 3,572,014 A | * | 3/1971 | Hansen | 96/138 |
| 3,645,072 A | * | 2/1972 | Clapham | 96/153 |
| 3,665,906 A | * | 5/1972 | De Palma | 123/519 |
| 3,727,597 A | * | 4/1973 | Hensler | 123/519 |
| 3,747,303 A | * | 7/1973 | Jordan | 96/135 |
| 3,844,739 A | * | 10/1974 | Alfrey, Jr. | 95/146 |
| 3,849,093 A | * | 11/1974 | Konishi et al. | 96/138 |
| 3,919,369 A | * | 11/1975 | Holden | 264/45.1 |
| 3,941,034 A | * | 3/1976 | Helwig et al. | 454/146 |
| 4,259,096 A | * | 3/1981 | Nakamura et al. | 96/138 |
| 4,261,717 A | * | 4/1981 | Belore et al. | 96/112 |
| 4,418,662 A | * | 12/1983 | Engler et al. | 96/133 |
| 4,510,193 A | | 4/1985 | Blucher et al. | |
| 4,514,197 A | * | 4/1985 | Armbruster | 96/138 |
| 4,610,705 A | * | 9/1986 | Sarnosky et al. | 96/135 |
| 4,714,486 A | * | 12/1987 | Silverthorn | 96/134 |
| 4,790,864 A | | 12/1988 | Kostun | |
| 4,793,837 A | | 12/1988 | Pontius | |
| 5,332,426 A | | 7/1994 | Tang et al. | |
| 5,338,340 A | * | 8/1994 | Kasmark et al. | 96/135 |

(List continued on next page.)

FOREIGN PATENT DOCUMENTS

GB   2028162 A   *   3/1980

*Primary Examiner*—Robert H. Spitzer
(74) *Attorney, Agent, or Firm*—Brinks Hofer Gilson & Lione

(57) ABSTRACT

The present invention is generally directed towards an air induction system in a motor vehicle and more specifically to an air filter in the air induction system. The air cleaner that functions to filter the ambient air before the air is delivered to the engine, is provided with a hydrocarbon adsorbing element. The hydrocarbon adsorbing element functions to act as a support screen for an air filter installed in the air cleaner and to adsorb hydrocarbons released by the engine. The hydrocarbon adsorbing element comprises a substrate coated with a hydrocarbon adsorbing chemical.

18 Claims, 4 Drawing Sheets

U.S. PATENT DOCUMENTS

| | | |
|---|---|---|
| 5,352,274 A | 10/1994 | Blakley |
| 5,783,080 A | 7/1998 | Hsieh |
| 6,200,368 B1 | 3/2001 | Guerin et al. |
| 6,203,592 B1 * | 3/2001 | Carawan ..................... 55/484 |
| 6,227,383 B1 | 5/2001 | De Ruiter et al. |
| 6,302,946 B1 * | 10/2001 | Cronia et al. ................. 96/154 |
| 6,416,570 B2 * | 7/2002 | Goto et al. .................... 96/134 |
| 6,423,108 B1 | 7/2002 | Mueller |
| 6,464,761 B1 * | 10/2002 | Bugli ........................... 96/135 |
| 2001/0013274 A1 * | 8/2001 | Oda ............................... 96/134 |
| 2002/0029693 A1 * | 3/2002 | Sakakibara et al. ........... 96/134 |
| 2002/0124733 A1 * | 9/2002 | Iriyama et al. ................ 96/134 |
| 2002/0129711 A1 * | 9/2002 | Oda et al. ...................... 96/134 |
| 2003/0041733 A1 * | 3/2003 | Seguin et al. ................. 96/108 |
| 2003/0066427 A1 * | 4/2003 | Ishida ........................... 96/135 |
| 2003/0101867 A1 * | 6/2003 | MacDowall et al. .......... 95/143 |
| 2003/0116021 A1 * | 6/2003 | Oda et al. ...................... 96/134 |
| 2003/0145732 A1 * | 8/2003 | Leffel et al. ................... 96/134 |

* cited by examiner

INTEGRATED FILTER SCREEN AND HYDROCARBON ADSORBER

TECHNICAL FIELD

This invention generally relates to an air filter in an air induction system in the engine of an automobile. More specifically to a hydrocarbon adsorbing material in the air filter.

BACKGROUND

Due to laws requiring the reduction of the levels of hydrocarbons that vehicles may emit into the atmosphere, it is necessary for automotive designers to include systems in vehicles to measure and control emissions. Hydrocarbons are released in a vehicle's exhaust, as well as from the engine, even when the engine is not operating. Hydrocarbons remaining from engine reactions can leak out of the engine through the engine's air intake.

The first step in reducing hydrocarbon emissions is to measure the level of hydrocarbons present in the engine system. Many methods have been utilized to measure the level of hydrocarbons in the exhaust. For example the hydrocarbon level in vehicle exhaust gas is measured by placing a hydrocarbon adsorbing material in the exhaust stream of the vehicle. The hydrocarbon adsorbing material is connected to a sensor. The sensor is connected to an on-board diagnostic system that monitors the exhaust emissions and notifies the operator when the hydrocarbon level exceeds a certain level. However, this method does not reduce the hydrocarbon emissions by any significant amount.

Apart from measuring the level of hydrocarbons in the exhaust, it is thus beneficial to reduce the level of hydrocarbons. One method of doing so is to absorb hydrocarbons from the exhaust flow via a filter-like device. A problem arises, however, wherein the adsorbing element eventually becomes saturated with hydrocarbons and is no longer able to function effectively. It would be beneficial to have a hydrocarbon-trapping device that would not have this limitation. Such an element could also be used to condition the air intake flow to increase engine capacity as well as for implementing a hydrocarbon-measuring feature.

Typically, the hydrocarbon-trapping device is formed of monolith carbon that is disposed in the air induction system of motor vehicles. One of the problems with such positioning of the hydrocarbon-trapping device in the air induction system is the risk of breakage due to vibrations, or due to throttle engine backfire. In addition to the loss of function of the hydrocarbon-trapping device, large pieces of carbon monolith may move towards the engine, thereby resulting in a premature failure of the engine of a motor vehicle. A separate hydrocarbon adsorber placed in the air induction system also results in more manufacturing steps, thereby driving up the cost of a motor vehicle.

Therefore, it is highly desirable to have a hydrocarbon-trapping device that substantially prevents carbon pieces from traveling to the engine and is not a separate component in the air induction system. Additionally, it is also desirable to have a hydrocarbon-trapping device that enhances the hydrocarbon adsorbing.

SUMMARY

In one aspect of the present invention, an air induction system installed in a motor vehicle is provided. The air induction system comprises an air cleaner, a clean air duct, a mass air flow sensor.

In yet another aspect of the present invention, the air filter is provided with an integrated screen that is coated with a hydrocarbon adsorbing material. The screen is attached to the housing of the air cleaner.

In yet another aspect of the present invention, a method of adsorbing hydrocarbons using a hydrocarbon screen in the air cleaner is provided.

Further features and advantages of the invention will become apparent from the following discussion and the accompanying drawings in which:

DETAILED DESCRIPTION

The following description of the preferred embodiment is merely exemplary in nature and is in no way intended to limit the invention or its application or uses.

Figure 1:
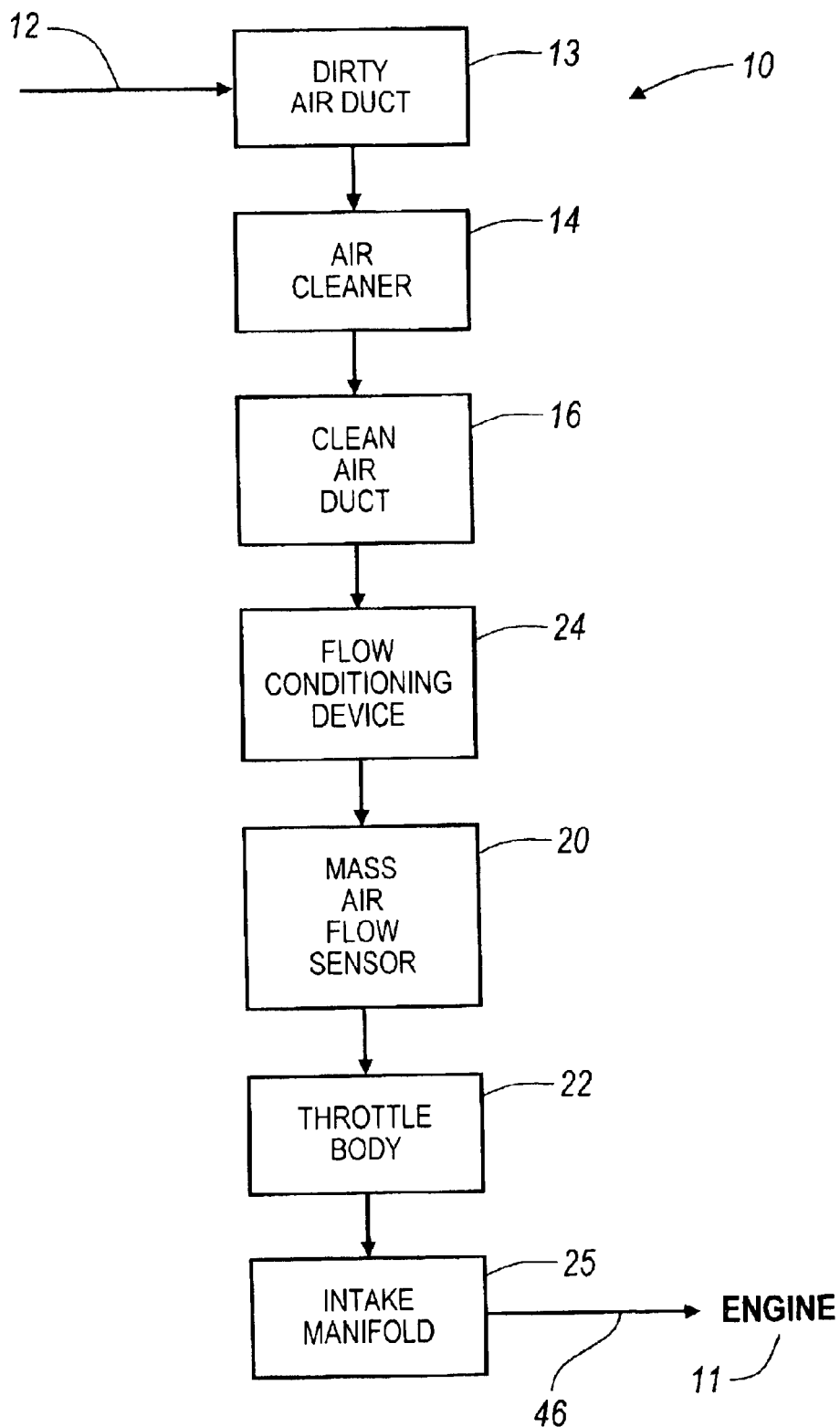
FIG. 1 is a block representation of the various components of an air induction system in accordance with the teachings of the present invention.

Referring in particular to FIG. 1, an air induction system installed in the vicinity of an engine 11 in an automobile is generally shown and represented by reference numeral 10. The air induction system 10, functions to filter and meter the air intake flow from the outside into the engine 11. The direction of the air flow from the outside to the engine 11 is shown by reference numeral 12.

The air induction system 10 comprises a dirty air duct 13, an air cleaner 14, a clean air duct 16, a mass air flow sensor (MAFS) 20, throttle body 22 and an intake manifold 25 connected to the engine. Although not shown in the drawings, the MAFS 20 is typically housed inside a MAFS housing duct that is connected to the clean air duct 16. The MAFS 20 is located downstream from the air cleaner 14 and upstream from the throttle body 22 directly in the path of the air flow 12. Alternatively, the MAFS 20 can be placed outside the air cleaner 14 and the MAFS housing duct may be connected to the clean air duct 16. In order to condition the flow of air to the MAFS 20, the air induction system may also comprise a flow conditioning device 24 positioned in the clean air duct upstream from the MAFS 20.

Figure 2:
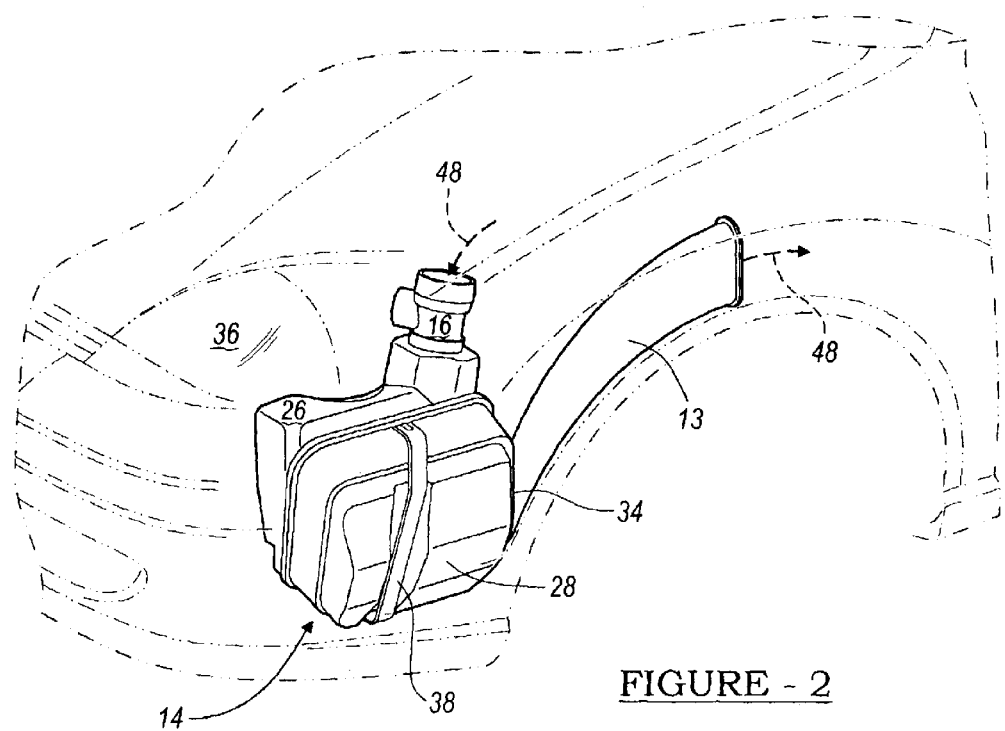
FIG. 2 is a perspective view of the air cleaner inside a hood of a motor vehicle in accordance with the teachings of the present invention.

Referring in particular to FIG. 2, the dirty air duct 13 functions to draw ambient air into the air induction system. In order to effectively draw the air from the environment the dirty air duct 13 may be provided with an air inlet venturi (not shown). The air drawn from the environment is then transported to the air cleaner 14. Since the air from the environment has dust and dirt particles that are harmful to the operation of the engine 11, the air cleaner 14, functions to filter the air drawn or inducted from the outside before it is delivered to the engine 11. The air cleaner 14 is connected to the clean air duct 16 such that the air after being filtered by the air cleaner 14 flows to the clean air duct 16.

Figures 3, 4:
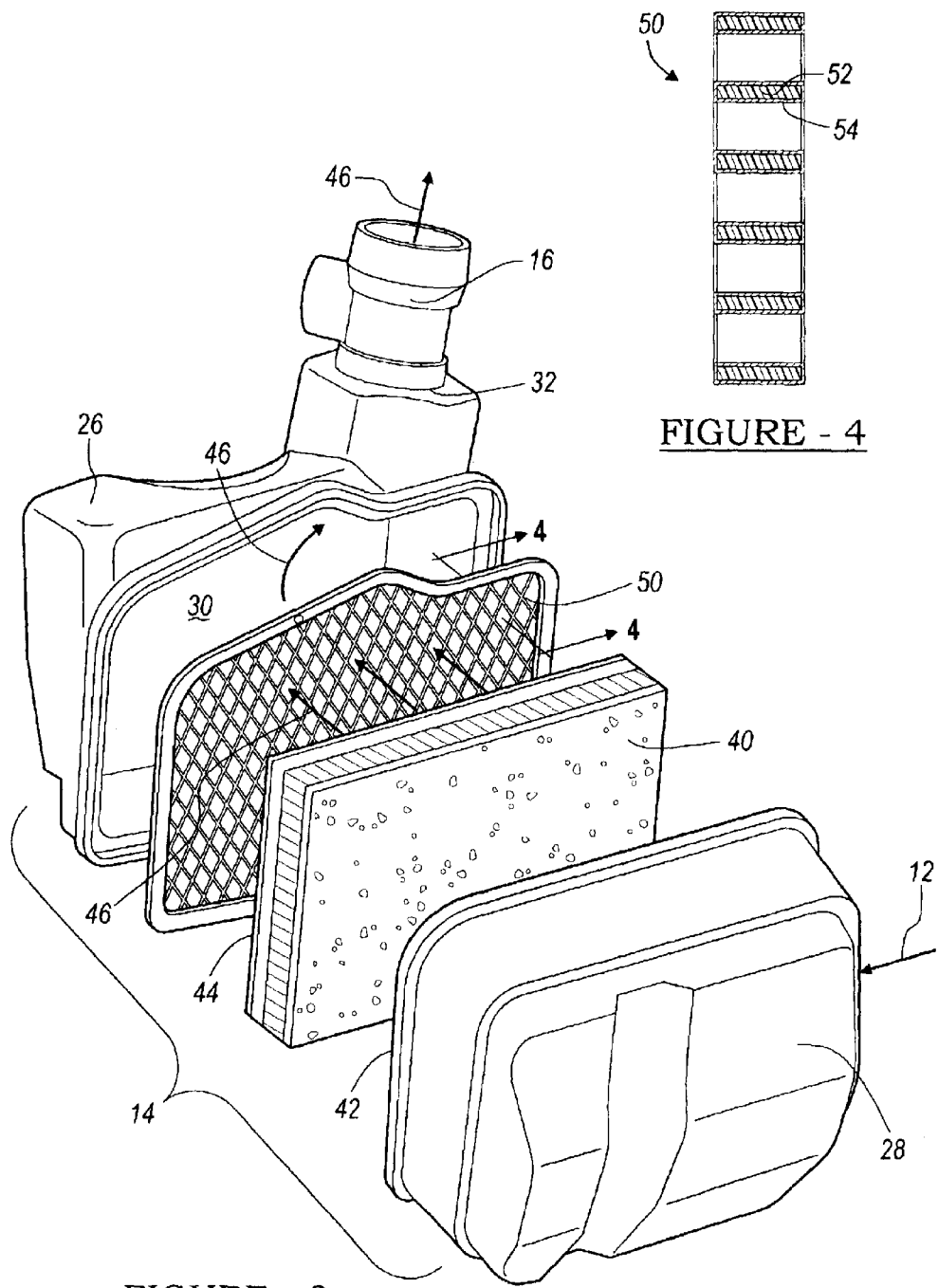
FIG. 3 is an exploded view of the air cleaner in accordance with the teachings of the present invention.
FIG. 4 is a cross-sectional view of the hydrocarbon adsorbing element along lines 4—4 of FIG. 3 in accordance with the teachings of the present invention.

Referring in particular to FIGS. 2 and 3, the air cleaner 14 is formed from a two-piece housing 26, 28 defining an elongated flat like air cleaner 14. The housing defines a closed hollow interior or shell 30, wherein the first portion 26 has a clean air port 32 for connecting the clean air duct 16. The second portion 28 of the housing has an inlet port 34 located on the side of the second portion 28 (see FIG. 2) for connecting the dirty air duct 13. As clearly shown in FIG. 2, the 2 piece housing is assembled to define a one piece air cleaner 14 installed underneath a hood 36 of an motor vehicle. The air cleaner is attached to the motor vehicle with a help of a clamp 38 provided on the second portion 28.

Preferably, the two piece housing 26, 28 is made of plastic and the two pieces are snap fitted together to provide a one piece air cleaner 14. Alternatively, the housing may be made of metal or plastic metal composites. Although in the drawings, an air cleaner 14 having a rectangular shape is shown and described, it must be understood that the air cleaner 14 may have different shapes, such as round or oval.

Referring in particular to FIG. 3, the air cleaner 14 comprises an air filter material 40. The air filter material 40 in disposed in the hollow interior 30 of the two piece housing 26, 28. The air filter material 40, functions to absorb the dirt present in the ambient air and divides the housing into a dirty air portion 42, located upstream from the air filter material 40 and a clean air portion 44 located downstream from the air filter material 40. Typically, the air filter material 40 is a made of paper formed of compressed fabric. In order to allow air to pass through the air filter element, the air filter material 40 is provided with microscopic holes. As the air is drawn from the environment, the air filter material 40 collects the dirt and dust particles. Alternatively, the air filter material 40 may have added or be formed of oil based material such that dirt and dust will stick to the air filter material 40. The clean air exiting the air filter material 40, shown by arrow 46 is substantially free of dirt and dust particles.

When the engine is switched on, the air is drawn from the environment, is filtered by the air filter material 40 and the clean air 46 is transported to the engine. However, when the engine is switched off, unburnt hydrocarbons are released to the environment through the dirty air duct 13 as shown by broken arrows 48 in FIG. 2. Therefore, to prevent hydrocarbons from escaping to the environment, the air cleaner 14 is provided with a hydrocarbon adsorbing element 50.

Figure 5:
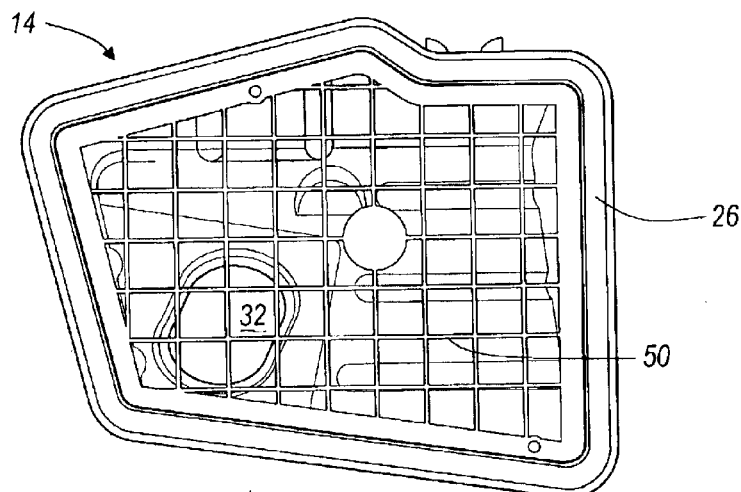
FIG. 5 is a front view of the hydrocarbon adsorbing element attached to one portion of a housing of the air cleaner of FIG. 3 in accordance with the teachings of the present invention.

As shown in FIG. 3, the hydrocarbon adsorbing element 50 is positioned downstream from the air filter material 40 in the clean air portion 44 of the housing. As clearly shown in FIG. 5, the hydrocarbon adsorbing element 50 has the same shape as the first portion 26 of the housing. Preferably, the hydrocarbon adsorbing element 50 is attached to first portion 26 by welding, insert molding or permanent snaps such that it can not be easily detached from the housing. Therefore, when the engine 11 is operating, the clean air 46 exiting the air filter material 40 would pass through the hydrocarbon adsorbing element 50 to the clean air duct 16. The hydrocarbon adsorbing material 50 also functions as a support screen for the air filter material 40 and helps to restrain the air filter material 50 inside the housing.

The hydrocarbon adsorbing element 50 adsorbs the hydrocarbons released by the engine when the engine 11 is not operating and releases these hydrocarbons when the engine 11 is operating. As shown in FIG. 4, the hydrocarbon adsorbing element 50 comprises a substrate 52 and a hydrocarbon adsorbing chemical 54 coated on the substrate 52. Preferably, the substrate 52 is a screen having chambers or holes 56 that will allow air to pass through the screen. Preferably, the substrate 52 is formed of metal. Alternatively, the substrate 52 may be a plastic screen. The hydrocarbon adsorbing chemical 54 used to coat the substrate 52 is selected from a group consisting of carbon, activated carbon, zeolite or carbon mixed with ceramic. Preferably, the hydrocarbon adsorbing chemical 54 is coated on the substrate 52 using trading coating techniques such as wash-coating, dipping, spray application, electro coating.

In the preferred embodiment, the hydrocarbon adsorbing element 50 is self-regenerating. Rather than absorbing hydrocarbons and trapping them in until the hydrocarbon adsorbing element 50 is saturated, the hydrocarbons may be relatively easily released from the hydrocarbon adsorbing element 50. The release occurs when the engine 11 is operating and pulling air into the clear air duct 16 at a moderate to high rate. Preferably, when air passes through the air cleaner 14, the hydrocarbons trapped in the hydrocarbon adsorbing element 50 are pulled out and travel down the clean air duct 16 to the engine, where they are burned off. By allowing the hydrocarbons to be released from the hydrocarbon adsorbing element, the preferred embodiment of the invention is self-regenerating, and the hydrocarbon adsorbing element 50 does not have to be replaced over the lifetime of the vehicle as a result of hydrocarbon build-up.

The air cleaner 14 having the hydrocarbon adsorbing element 50 can be manufactured by providing a two piece housing 26, 28. The hydrocarbon adsorbing element is obtained by coating a substrate 52 with a hydrocarbon adsorbing chemical 54. The air cleaner 14 is then assembled by inserting an air filter material 40 inside the housing and attaching the hydrocarbon adsorbing material 50 to the first portion 26 of the housing.

Figure 6:
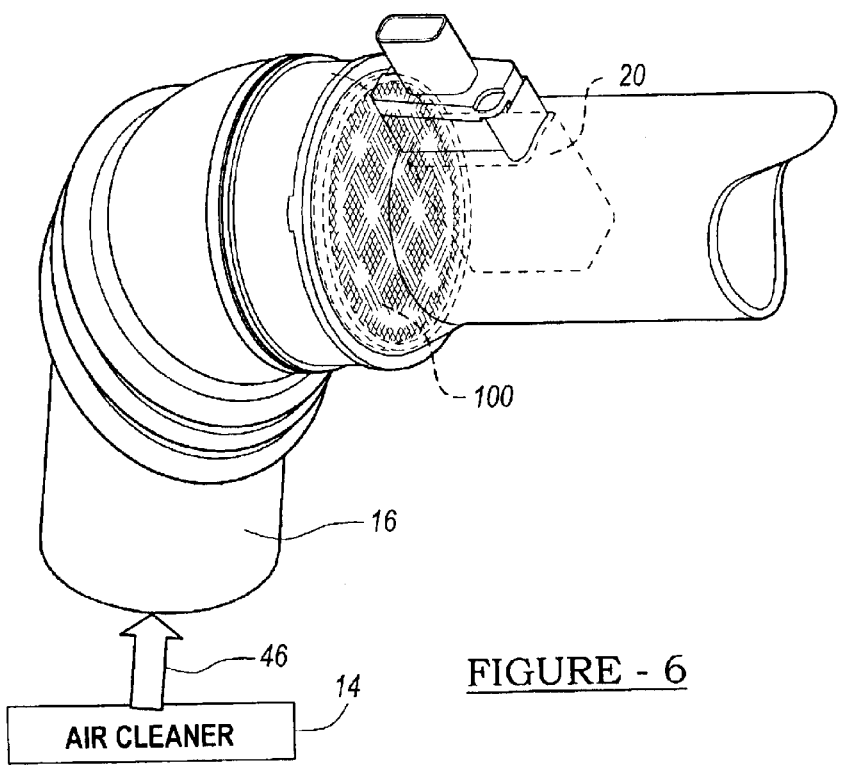
FIG. 6 is a perspective view of the alternate embodiment of the hydrocarbon adsorbing element of FIG. 3 in accordance with the teachings of the present invention.

FIG. 6 represents an alternate embodiment of the hydrocarbon adsorbing element 100 installed in the air induction system 10. The hydrocarbon adsorbing element 100 is positioned downstream from the air cleaner 14 and upstream from MAFS 20. As clearly shown in FIG. 6, hydrocarbon adsorbing element 100 is round or spherical in shape such that it can be placed in the interior surface of the clean air duct 16. The hydrocarbon adsorbing element 100 is identical in structure and function to the hydrocarbon adsorbing element 50 described above. In this embodiment, the hydrocarbon adsorbing element 100 performs dual function of conditioning the air flow to the MAFS 20 when the engine is operating and adsorb hydrocarbons when the engine is turned off. Alternatively, an existing flow conditioning device 24 may be coated with a hydrocarbon adsorbing chemical 54, such that the flow conditioning device adsorbs hydrocarbons released from the engine.

As seen from the above, the present invention provides for a hydrocarbon adsorbing element that can be a part of one of the components in the air induction system. The present invention also helps any existing component in the air induction system to be a hydrocarbon adsorbing element by coating the component with hydrocarbon adsorbing chemical. This significantly reduces the number of components in the air induction system. Although specific emphasis has been given to the hydrocarbon adsorbing material in the air induction system of a motor vehicle, it must be understood that the present invention may be used on an exhaust system of a motor vehicle.

As any person skilled in the art will recognize from the previous description and from the figures and claims, modifications and changes can be made to the preferred embodiment of the invention without departing from the scope of the invention as defined in the following claims.

What is claimed is:

1. An air induction system for transporting ambient air into an engine of an automobile, the system comprising:
   a first, upstream duct for drawing the ambient air;
   a second, downstream duct for supplying clean air to the engine; and
   an air cleaner including a housing defining a hollow interior in communication with the first and second ducts, an air filter removably disposed within the interior of the housing for removing debris from the ambient air flowing through the air cleaner, and a hydrocarbon adsorbing element permanently attached to the housing downstream of the air filter for adsorbing hydrocarbons released by the engine when the engine is not operating, the hydrocarbon adsorbing element supporting the air filter to thereby restrain movement of the air filter within the housing.

2. The system of claim 1 wherein the hydrocarbon adsorbing element is disposed within the hollow interior of the housing.

3. The system of claim 2, wherein the housing includes a cover attachable to the second duct and a tray attachable to the first duct.

4. The system of claim 3, wherein the hydrocarbon adsorbing element is attached to the cover of the housing, and the hydrocarbon adsorbing element defines a downstream support for the air filter.

5. The system of claim 1, wherein the hydrocarbon adsorbing element comprises a substrate and a hydrocarbon adsorbing chemical coated on the substrate.

6. The system of claim 5, wherein the substrate is a screen having a plurality of holes to allow ambient air to pass through.

7. The system of claim 5, wherein the hydrocarbon adsorbing chemical is selected from a group consisting of carbon, activated carbon, zeolite and carbon mixed with ceramic.

8. The system of claim 5, wherein the hydrocarbon adsorbing chemical is coated to the substrate by a method selected from a group consisting of wash-coating, dipping, spray application, plating and electrocoating.

9. The system of claim 1, wherein the air induction system further comprises a flow conditioning device located downstream from the air cleaner such that the flow conditioning device conditions the clean air flowing through the second duct.

10. The system of claim 9, wherein the flow conditioning device is coated with a hydrocarbon adsorbing chemical such that the flow conditioning device functions to adsorb hydrocarbons released by the engine.

11. An air cleaner installed in an air induction system for transporting ambient air into an engine of an automobile, the air cleaner comprising:
    a two-piece housing including a first portion having a first port for receiving the ambient air and a second portion having a second port for transporting clean air to the engine, the first and second portions of the housing cooperating to define a hollow interior;
    an air filter disposed within the hollow interior of the housing; and
    a hydrocarbon adsorbing element attached to the first portion of the housing, downstream of the air filter, such that the hydrocarbon adsorbing element cannot be easily detached from the housing, wherein the hydrogen adsorbing element supports the air filter to thereby restrain movement of the air filter within the housing, and wherein the hydrocarbon adsorbing element adsorbs hydrocarbons released from the engine.

12. The air cleaner of claim 11, wherein the hydrocarbon adsorbing element comprises a substrate and a hydrocarbon adsorbing chemical coated on the substrate.

13. The air cleaner of claim 12, wherein the substrate is a screen having a plurality of holes to allow clean air to pass through.

14. The air cleaner of claim 12, wherein the hydrocarbon adsorbing chemical is selected from a group consisting of carbon, activated carbon, zeolite and carbon mixed with ceramic.

15. The air cleaner of claim 12, wherein the hydrocarbon adsorbing chemical is coated to the substrate by a method selected from a group consisting of wash-coating, dipping, spray application, plating and electrocoating.

16. A method of manufacturing an air filter in an air induction system, wherein the air induction system transports ambient air to an engine of a motor vehicle, the method comprising:
    providing a two piece housing defining a hollow interior;
    removably inserting an air filter material inside the hollow interior, wherein the air filter material separates the housing into a clean air portion and a dirty air portion; and
    permanently attaching a hydrocarbon adsorbing element to the clean air portion of the housing, whereby a removal of the air filter material from the hollow interior of the housing does not affect attachment of the hydrocarbon adsorbing element to the housing.

17. The method of claim 16, further comprising forming the hydrocarbon adsorbing element by coating a substrate with a hydrocarbon adsorbing chemical.

18. The method of claim 17, wherein the hydrocarbon adsorbing chemical is selected from a group consisting of carbon, activated carbon, zeolite and carbon mixed with ceramic.

* * * * *